United States Patent
Leffew et al.

(10) Patent No.: US 6,451,966 B1
(45) Date of Patent: Sep. 17, 2002

(54) METHOD FOR INCREASING SOLID STATE POLYMERIZATION RATE

(75) Inventors: Kenneth Wayne Leffew, Kennett Squard, PA (US); Andrew Robert Witt, Mount Juliet, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/927,654

(22) Filed: Aug. 10, 2001

(51) Int. Cl.[7] .................................................. C08F 6/00
(52) U.S. Cl. ........................ 528/481; 528/483; 528/492; 528/503
(58) Field of Search ................................ 528/481, 483, 528/492, 503

(56) References Cited

U.S. PATENT DOCUMENTS

| | | |
|---|---|---|
| 3,405,098 A | 10/1968 | Heighton et al. |
| 3,544,525 A | 12/1970 | Balint et al. |
| 4,064,112 A | 12/1977 | Rothe et al. |
| 4,165,420 A | 8/1979 | Rinehart |
| 4,254,253 A | 3/1981 | Brent, Jr. et al. |
| 4,271,287 A | 6/1981 | Shah |
| 5,510,454 A | 4/1996 | Stouffer et al. |
| 5,540,868 A | 7/1996 | Stouffer et al. |
| 5,633,018 A | 5/1997 | Stouffer et al. |
| 5,714,262 A | 2/1998 | Stouffer et al. |
| 5,730,913 A | 3/1998 | Stouffer et al. |
| 5,739,269 A | 4/1998 | Ghatta et al. |

OTHER PUBLICATIONS

Comprehensive Polymer Science, The Synthesis, Characterization, Reactions and Applications of Polymers, vol. 5, Step Polymerization, "13 Solid–State Polymerization," Francesco Pilati, pp. 201–216.

*Primary Examiner*—Samuel A. Acquah
(74) *Attorney, Agent, or Firm*—Charles E. Krukiel

(57) ABSTRACT

A process for increasing the rate of polymerization of low molecular weight polyester particles under solid state processing conditions whereby the progress of polymerization is preferred over the progress of crystallization for a given mass of particles.

8 Claims, 2 Drawing Sheets

METHOD FOR INCREASING SOLID STATE POLYMERIZATION RATE

BACKGROUND OF THE INVENTION

The present invention relates to solid state polymerization of low molecular weight polyester particles, and, more particularly, to a method for increasing the rate of polymerization of such particles under solid state processing conditions whereby the progress of polymerization is preferred over the progress of crystallization for a given mass of particles. As a result, the reaction time in the solid state required to reach a selected polymer molecular weight is substantially reduced.

It is known to produce high viscosity, i.e., high molecular weight, polyester polymers in the solid phase at temperatures below the melting point of the low molecular weight starting pre-polymer particles and under an inert gas blanket or vacuum. According to U.S. Pat. No. 4,064,112, the is tendency of the particles to agglomerate due to stickiness during solid state polymerization (SSP) can be reduced and even eliminated if the solid state polymerization is preceded by a crystallization step utilizing temperatures which are higher than, or equal to, the temperature at which the solid state polymerization is carried out.

U.S. Pat. No. 5,540,868 describes a process for forming uniform, crystalline low molecular weight polyester particles in size ranges suitable for mass handling. Such particles, or pellets, which have a degree of crystallinity greater than about 15%, are especially advantageous for use as a pre-polymer feestock for solid state polymerization. The particles can be introduced into the SSP reactor within 10 minutes after the particles are formed. Alternatively, it is also possible to store the pellets for an indefinite period of time before feeding them to the SSP reactor.

Despite the ability to produce uniform, crystalline low molecular weight polyester particles which can be directly polymerized in the solid state without further crystallization or annealing, there is a need to reduce the generally long processing time, e.g., up to 30 hours or longer, which is typically required using conventionally known SSP techniques to increase the molecular weight of these particles to the minimum requisite level for commercial use.

SUMMARY OF THE INVENTION

The present invention resides in the discovery that the rate of polymerization of low molecular weight polyester pre-polymer particles under solid state processing conditions can be substantially increased by observing specific parameters with respect to particle heating, i.e., conditioning. By following the processing conditions in the sequence described according to the invention, the progress of polymerization for low molecular weight polyester pre-polymer particles in the solid state is preferred over the progress of crystallization within a given mass of particles. The polymerization reaction time for a given low molecular weight pre-polymer to reach a desired higher molecular weight range is substantially reduced.

The present invention is an improved process for polymerizing low molecular weight polyester prepolymers in the solid state which comprises:

(a) contacting the particles with a heat-transfer medium to heat the particles to a temperature in the range of from about 205° C. to 240° C. in less than 10 minutes with the result that the time at which the particles are within the temperature range of 100° C. to 205° C. is minimized, (b) maintaining the temperature achieved for the particles in step (a) for at least one hour by subjecting the particles to a continuously moving stream of inert gas at elevated temperature and at a mass of gas to mass of solids ratio which can be as low as 0.05 whereby the progress of polymerization of said particles is preferred over the progress of crystallization, and then (c) subjecting the particles to a countercurrently moving stream of heated inert gas at a mass of inert gas to mass of solids ratio which is less than the mass ratio maintained in step (b), but the total mass of inert gas to mass of solids ratio for step (a) and step (b) is equal to or greater than 0.6.

In a preferred embodiment of the invention the low molecular polyester particles are essentially-crystalline, meaning that they have a crystallinity content greater than about 15%, which corresponds, for polyethylene terephthalate (PET), to a density greater than about 1.36 g/cc. In addition, the heat transfer medium is a stream of inert gas at elevated temperature, and the particles are contacted in step (a) at a mass of gas to mass of solids ratio in the range of from 4:1 to 15:1 to effect a rapid rise in temperature whereby the polyester particles reach a temperature of at least 205° C. in less than 10 minutes.

BRIEF DESCRIPTION OF THE DRAWING(S)

DETAILED DESCRIPTION OF THE INVENTION

Figure 1:
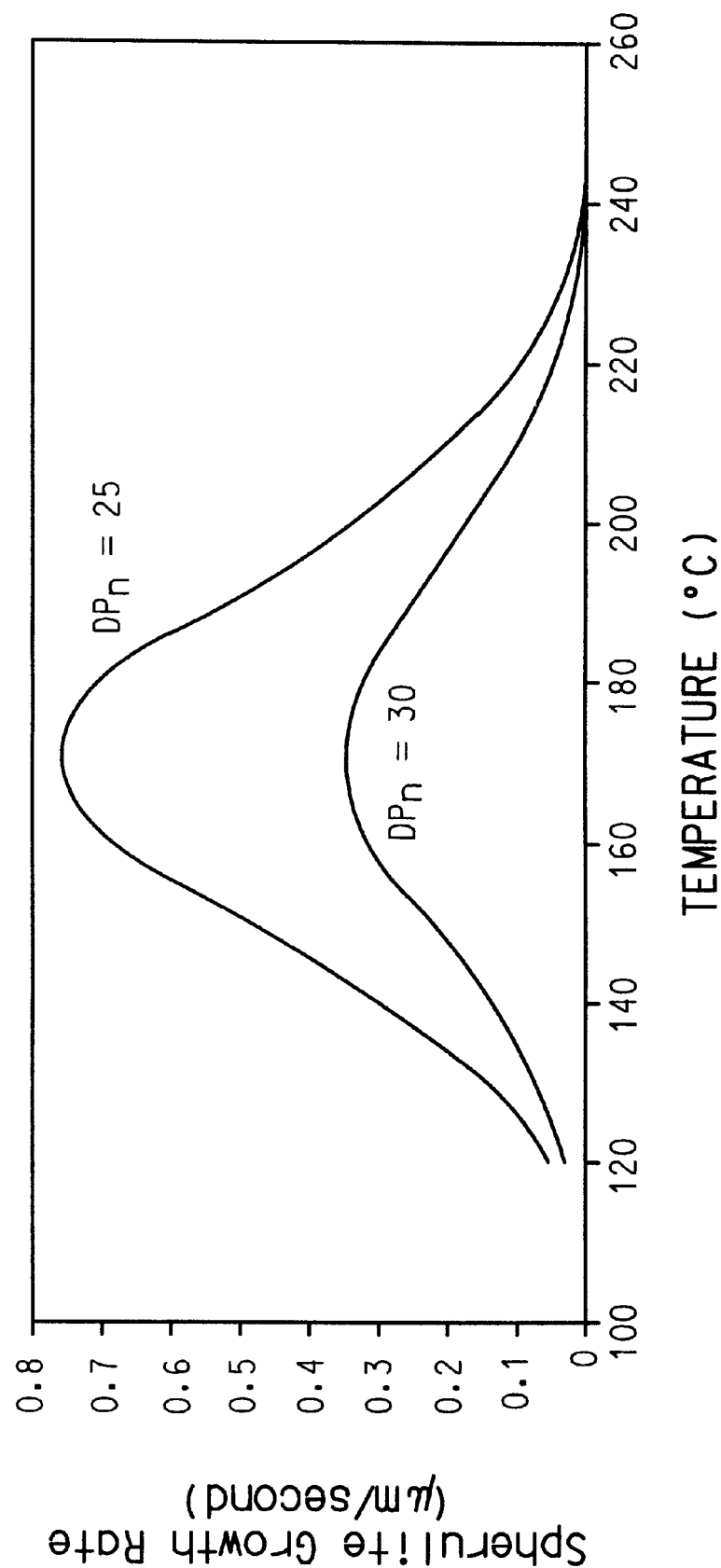
FIG. 1 is a graph which illustrates the relationship of crystal average. diameter growth rate as a function of degree of polymerization ($DP_n$) and temperature which applies when heating low molecular weight polyester pre-polymer particles.

The present invention is an improved process for polymerizing low molecular weight polyester prepolymers in the solid state. In another aspect, the present invention is a method for increasing the rate of polymerization of low molecular weight polyester polymer particles in the solid state.

The polyester polymer particles which comprise the feedstock to the SSP reactor according to the instant invention are essentially-crystalline particles, or pellets. According to one embodiment of the invention, they are obtained by thermal shock treatment of conventionally-formed, essentially amorphous, non-molten, polyester pellets at about ambient temperatures, or they can be produced from essentially amorphous molten polyester droplets by rapidly subjecting the droplets to thermal shock, according to the process described in U.S. Pat. No. 5,540,868, the teachings of which are incorporated herein by reference. During the imposition of the thermal shock, the polymer droplets, or pellets, are exposed to a temperature ranging from about $T_{max}$ to $T_{min}$ for at least a period of about 3 seconds. By way of an example, when making pellets of polyethylene terephthalate (PET), an essentially-crystalline PET pellet may be formed from an essentially-amorphous (i.e., having less than 10% crystalline content) melt of a PET oligomer at a temperature $T_1$ wherein $T_1$ is at least 250° C. The molten droplets are then crystallized by placing them in contact, for at least 3 seconds, with a solid, preferably metallic, surface which is at a temperature within the range of $T_{min}$ to $T_{max}$ wherein $T_{min}$ is at least 80° C. up to 150° C. and $T_{max}$ is between about 180° C. and 220° C. The thus-obtained essentially crystalline PET polymer pellets, or particles, are characterized by having a degree of poymerization of about 5 to about 35, an average apparent crystallite size of 9 nm or more, and a melting point of 270° C. or less. However, the improved solid state polymerization process according to the invention is not limited by the process by which the essentially-crystalline low molecular weight pre-polymer particles are formed.

"Esentially-crystalline polyester" is used herein to mean having a crystallinity content greater than about 15%, but typically greater than 30%, corresponding, respectively, for PET, for example, to a density greater than about 1.36 g/cc, but typically greater than 1.39 g/cc. The terms "essentially-crystalline" or "crystalline", as used herein are intended to include what is commonly referred to as "semi-crystalline," as are most polyesters of interest. The amount of crystallinity can be determined by DSC. For example, essentially-crystalline PET is characterized by a total heat of fusion, expressed in J/g, of at least about 20 up to about 35, when 140 J/g is used as the total heat of fusion of pure crystalline PET. Higher heats of fusion indicate more crystalline polymer. The percent crystallinity within a is sample of a polyester material or pellet can be determined by comparing the heat of fusion (J/g) of the crystallites present with the heat of fusion of the "pure" crystalline polyester.

Polymerization in the solid state generally involves subjecting pre-polymer polyester pellets to a thermal environment such that the pellets achieve an elevated temperature which is below the melting point for the polymer under an inert gas blanket or vacuum. The particles must remain within the selected temperature region for a sufficient period of time, e.g., up to 30 hours or longer, for a minimum amount of polymerization to occur for the resulting particles to have practical utility, i.e., be of high enough molecular weight to be useful in downstream processing.

Polymerization in the solid state according to the invention involves subjecting the pellets to a series of thermal environments in a specific sequence such that the pellets rapidly achieve a minimum temperature of at least 205° C., and preferably 230° C., with minimum time spent in the 100° C. to 205° C. temperature range, i.e., the pellets should spend no more than 10 minutes in the 100° C. to 205° C. temperature range, and preferably no more than 5 minutes. When that is achieved, the particles undergo polymerization without the tendency to undergo further crystallization, i.e., the progress of polymerization of said particles is preferred over the progress of crystallization. The time the particles spend in the 100° C. to 205° C. temperature range may exceed the 5–10 minute range, but there will be a corresponding increase in total time required for polymerization. Although the particles must remain within the thermal environment for a sufficient period of time for a desired amount of polymerization to occur, the actual, i.e., total, time required for polymerization in the solid state is substantially reduced over the time required when crystallization is allowed to take precedence over polymerization.

The term "pellet" and "particle" are used herein to mean any discrete unit or mass of a given polyester material, having any shape or configuration, irregular or regular, within a wide range of sizes. Although the term "pellet" and/or "particle" might elsewhere have a narrower connotation, the terms are employed herein to include particles and pellets in the broadest sense of the word. Preferred forms and/or sizes for particles are spherical particles with diameters of 0.05 mm to 0.3 mm, hemispherical particles with a maximum cross section of 0.1 mm to 0.6 mm, or right circular cylinders with a diameter of 0.05 mm to 0.3 mm and a length of 0.1 cm to 0.6 cm. Since, preferably, the pellets are produced on the most economically efficient equipment, the pellets could conveniently be produced and collected together in commercial quantities of greater than 30 kg. The pellets may be used in the same plant soon after being made, stored for later use, or packaged for transport, all in commericial quantities.

Polyesters of the type which are useful according to the invention are polymers generally comprised of one or more diacid or diester components and one or more diol components. The process of the invention is useful for most aromatic or aliphatic-ring-containing (for example, phenyl or cyclohexyl-containing) polyesters. This would include, for example, poly(ethylene terephthalate) (PET), poly (ethylene napthalate) (PEN), poly(butylene naphthalate) (PBN), poly(trimethylene terephthalate) (3G-T), and poly (trimethylene naphthalate) (3G-N), poly(cyclohexyl terephthalate) (PCT), and the like. Generally, polyesters having a glass transition temperature, $T_g$, above about 25° C., and a melt temperature, $T_m$, ranging from about 200° C. to about 320° C. are best suited for the method of this invention.

The approximate $T_g$ and $T_m$ values for some useful polyesters are listed below in degrees Celsius.

|  | $T_g$ | $T_m$ |
| --- | --- | --- |
| PET | 70 | 260 |
| PEN | 120 | 270 |
| PBN | 82 | 242 |
| 3G-T | 35 | 227 |

Suitable diacid or diester components for the polyesters to which this invention pertains normally include alkyl dicarboxylic acids having 4 to 36 carbon atoms, diesters of alkyl dicarboxylic acids having 6 to 38 carbon atoms, aryl dicarboxylic acids which contain from 8 to 20 carbon atoms, diesters of aryl dicarboxylic acids which contain from 10 to 22 carbon atoms, alkyl sustituted aryl dicarboxylic acids which contain from 9 to 22 carbon atoms, or diesters of alkyl substituted aryl dicarboxylic acids which contain from 11 to 22 carbon atoms. Preferred alkyl dicarboxylic acids contain from 4 to 12 carbon atoms. Some representative examples of such alkyl dicarboxylic acids include glutaric acid, adipic acid, pimelic acid and the like. Preferred diesters of alkyl dicarboxylic acids contain from 6 to 12 carbon atoms. A representative example of such a diester of an alkyl dicarboxylic acid is azelaic acid. Preferred aryl dicarboxylic acids contain from 8 to 16 carbon atoms. Some representative examples of aryl dicarboxylic acids are terephthalic acid, isophthalic acid and orthophthalic acid. Preferred diesters of aryl dicarboxylic acids contain from 10 to 18 carbon atoms. Some representative examples of diesters of aryl dicarboxylic acids include diethyl terephthalate, diethyl isophthalate, diethyl or orthophthalate, dimethyl naphthalate, diethyl naphthalate and the like. Preferred alkyl substituted aryl dicarboxylic acids contain from 9 to 16 carbon atoms and preferred diesters of alkyl substituted aryl dicarboxylic acids contain from 11 to 15 carbon atoms.

The diol component for polyesters used in the invention suitably include glycols containing from 2 to 12 carbons atoms, glycol ethers containing from 4 to 12 carbon atoms and polyether glycols having the structural formula HO—(AO)$_n$H, wherein A is an alkylene group containing from 2 to 6 carbon atoms and wherein n is an integer from 2 to 400.

Generally, such polyether glycols will have a molecular weight of about 400 to 4000.

Preferred glycols normally contain from 2 to 8 carbon atoms with preferred glycol ethers containing from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, and the like.

The polyesters or oligomers of the present invention may be branched or unbranched, and may be homopolymers or copolymers.

Particularly useful commercially are "modified polyesters" which are defined as being modified with up to about 10% by weight of a comonomer. Unless indicated otherwise, by the term "polyester" is meant modified or unmodified polyester polymers. Similarly, by the mention of a particular polyester, for example PET, is meant unmodified or modified PET. Comonomers can include diethylene glycol (DEG), triethylene glycol, 1,4-cyclohexane dimethanol, isophthalic acid (IPA), 2,6-naphthalene dicarboxylic acid, adipic acid and mixtures thereof. Frequently used comonomers for poly(ethylene terephthalate) include 0–5% by weight IPA and 0–3% by weight DEG.

The polyester pre-polymers or oligomers comprising the pellets commercially useful according to the present invention can optionally be pre-polymerized from monomers, oligomers, or mixtures thereof. This optional pre-polymerization step may be accomplished using known methods and apparatus, as will be readily appreciated by the skilled artisan. Polymerization of polyesters is well known in the art. Polyesters are often formed as a melt by combining a diacid or diester with a diol to produce a monomer, and heating to polymerize the monomer. A convenient method of polymerization to achieve a low molecular weight polyester is to carry out the polymerization reaction using a pipeline reactor.

Polymerization is conducted to reach a desired degree of polymerization. Generally, the polyester used to make low molecular weight pre-polymer pellets has a degree of polymerization ranging from about 2 to about 40. By degree of polymerization (DP) is meant the average number of repeat units in a polymer chain and therefore may not necessarily be an integer. For example, the repeat unit of poly(ethylene terephthalate) (PET) is

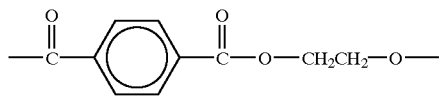

The DP of a polymer can be determined by Gel Permeation Chromatography using appropriate standards. The degree of polymerization can be influenced by the pellet-forming means that is employed and the anticipated use of the final pellets. Generally, a DP of about 5 to 35 is preferred for PET when the pellet formation means is a pastillator. A pastillator is a commercially available droplet-forming means which comprises an outer container with orifices. The outer container rotates around an inner container to allow a uniform amount of the polymer melt to emerge as droplets. The droplets are collected on a conveyor, which cools the droplets for a time sufficient to solidify the droplets.

The degree of polymerization is merely one way of expressing the molecular weight of a polyester. Another measure of the molecular weight is the intrinsic viscosity (IV) of the polymer. For example, a poly(ethylene terephthalate) polymer having a DP of 2 to 40 should have an IV which ranges from about 0.05 to about 0.4 dl/g when tested with a solution of one part volume of trifluoroacetic acid and three parts volume of methylene chloride.

An IV may be determined according to the following example: 0.050 g of a polyester such as, for example, PET is weighed into a clean dry vial and 10 ml of solvent is added using a volumetric pipette. The vial is closed (to prevent evaporation of the solvent) and shaken for 30 min or until the PET is dissolved. The solution is poured into the large tube of a #50 Cannon-Fenske viscometer, which is then placed in a 25° C. water bath and allowed to equilibrate to that temperature. The drop times between the upper and lower marks are then measured in triplicate, and should agree within 0.4 seconds. A similar measurement is made in the viscometer for the solvent alone. The IV is then calculated by the equation: IV=In[(solution time/solvent time)/0.5].

EXAMPLES

A series of three experiments was performed to examine the effect of crystallinity on SSP reaction rate. The experiments included a control experiment (Trial 1), an experiment whereby the heating and pretreatment step occurred faster than the control (Trial 2), and one experiment which used a comonomer to suppress crystallization in the SSP. (Trial 3) The control experiment was under conditions in which crystallization would have been favored over molecular weight build. More particularly, the control experiment was conducted with temperatures in a range where crystallization kinetics were favored over reaction kinetics.

Levels of isophthalic acid (IPA) and diethylene glycol (DEG) that were higher than in the other experiments were used to suppress crystallization in the PET in Trial 3. Trials 1 and 2 were performed using a continuous SSP process. Therefore, samples could be collected from each process step. Trial 3 was performed using a batch SSP process that fluidized the particles. Therefore, only beginning and ending samples could be collected and analyzed from Trial 3.

The starting materials for the three trials had the following compositions:

TABLE 1

|  | Trial 1 | Trial 2 | Trial 3 |
|---|---|---|---|
| Initial IV (dl/g) | 0.242 | 0.232 | 0.246 |
| IPA (% w/w) | 2.22 | 2.21 | 2.04 |
| DEG (% w/w) | 1.51 | 1.50 | 2.56 |
| Catalyst Type | Antimony | Antimony | Antimony |
| Catalyst Concentration (ppmw) | 275 | 275 | 275 |
| $\Delta H_f$ (J/g) | 55.05 | 54.10 | 48.66 |

Each of the trial materials was processed in a SSP (Solid State Polymerization Reactor), which used a fluidized bed heater, a first stage of reaction, a second stage of reaction, and either a static bed or fluidized bed cooler. The process conditions for each of the trials are shown below in Table 2:

TABLE 2

| Process Conditions | Trial 1 | Trial 2 | Trial 3 |
|---|---|---|---|
| Fluid Bed Heater | | | |
| Gas-to-Solids Ratio (mass) | 10:1 | 8:1 | — |
| Gas Temperature (° C.) | 240 | 235 | — |
| Solids Exit Temperature (° C.) | 215 | 230 | — |
| Residence Time (minutes) | 5 | 10 | — |
| 1$^{st}$ Stage Reaction | | | |
| Gas-to-Solids Ratio (mass) | 0:1 | 19:1 | — |
| Gas Temperature (° C.) | — | 240 | — |
| Solids Exit Temperature (° C.) | 232 | 240 | — |
| Residence Time (minutes) | 72 | 160 | — |
| 2$^{nd}$ Stage Reaction | | | |
| Gas-to-Solids Ratio (mass) | 1.25:1 | 15:1 | >20:1 |
| Gas Temperature (° C.) | 232 | 229 | 230 |
| Solids Exit Temperature (° C.) | 225 | 230 | 230 |
| Residence Time (minutes) | 1800 | 720 | 1440 |

The heats of fusion and intrinsic viscosities for each trial and each process step product is shown below:

TABLE 3

| Process Step | Trial 1 | Trial 2 | Trial 3 |
|---|---|---|---|
| Fluid Bed Heater Product | | | |
| IV (dl/g) | 0.247 | 0.239 | — |
| $\Delta H_f$ (J/g) | 56.20 | 57.45 | — |
| 1$^{st}$ Stage Reaction Product | | | |
| IV (dl/g) | 0.305 | 0.421 | — |
| $\Delta H_f$ (J/g) | 65.39 | 60.10 | — |
| 2$^{nd}$ Stage Reaction Product | | | |
| IV (dl/g) | 0.769 | 0.820 | 1.052 |
| $\Delta H_f$ (J/g) | 76.45 | 67.10 | 63.89 |

As seen in Table 3, final IV in these trials was inversely correlated with the heat of fusion of the product, which is a measure of the amount of crystallinity in the solid polymer. In fact, the trial with the lowest feedstock IV was polymerized in the solid state to the highest final IV. However, Trial 2, which used process settings to achieve a fast reaction rate, only had a total residence time (1$^{st}$ reaction stage plus the 2$^{nd}$ reaction stage) of 720 minutes compared to 1800 and 1440 minutes residence times for Trials 1 & 3, respectively.

Another way one may examine the data is to use the change in IV per change in heat of fusion as shown below in Table 4:

TABLE 4

| Parameter | Trial 1 | Trial 2 | Trial 3 |
|---|---|---|---|
| $\Delta IV/\Delta(\Delta H_f)$ (dl/g/J/g) | $2.44 \times 10^{-2}$ | $4.52 \times 10^{-2}$ | $5.29 \times 10^{-2}$ |

According to the data in Table 4, Trials 2 and 3 have reaction rates that are 4.5 to 6.5 times faster than their rate of crystallization. The polymer pellets in Trial 1 never reached the goal IV because too much crystallinity was built which retarded the polymeration.

Figure 2:
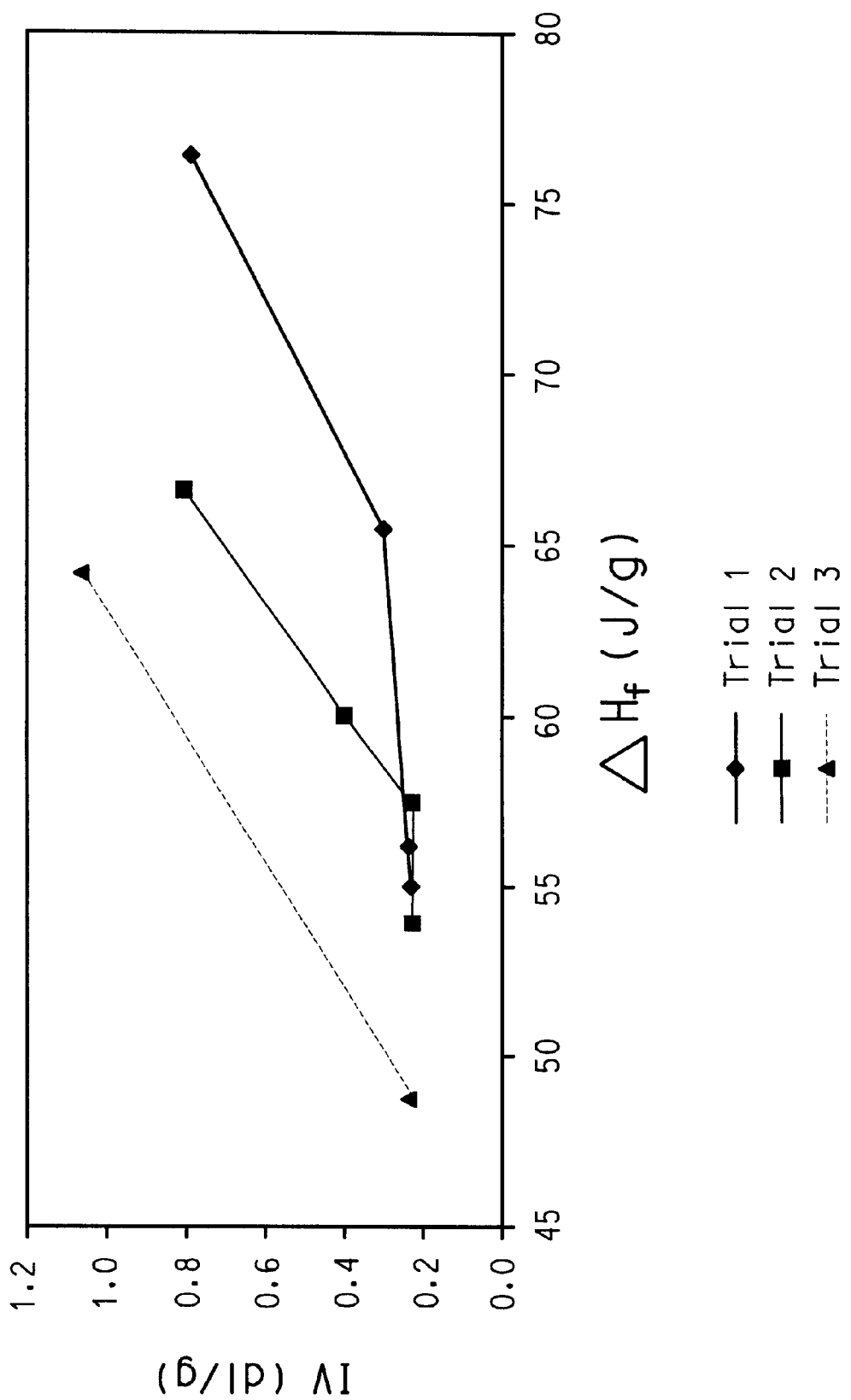
FIG. 2 is a graphical representation of the effect of crystallinity on intrinsic viscosity lift (dl/g) observed according to Example 1.

Referring now to the Figures, FIG. 2 illustrates IV build as a function of the heat of fusion for the steps in the process described in Table 2. The graph illustrates that polymer from Trial 1 builds more crystallinity than the other two trials, while Trial 2 accomplished a higher reaction rate according to the process of the invention.

Referring to FIG. 1, the graph illustrates the effect of number average degree of polymerization ($DP_n$) and temperature on crystallization growth rate. As polymer chain length increases, the rate of crystallization decreases. It is also evident from the graph that as temperature increases above approximately 175° C., the rate of crystallization decreases significantly. The process conditions of Trial 2 resulted in the rapid movement of solids temperature into the 225–230° C. range. At these temperatures the rate of crystallization is very low compared to that at 175° C. At these temperatures the inherent kinetic rates of reaction are also very high. Therefore, process conditions that result in the rapid increase of solids temperature to about 230° C. would favor the progress of reaction over the progress of crystallization. By suppressing the rate of crystallization, higher reaction rates are possible as seen in Table 4.

What is claimed is:

1. A process for polymerizing low molecular weight polyester prepolymers in the solid state which comprises:

(a) contacting the particles with a heat transfer medium to heat the particles to a temperature in the range of from about 205° C. to 240° C. in less than 10 minutes with the result that the time at which the particles are within the temperature range of 100° C. to 205° C. is minimized, (b) maintaining the temperature achieved for the particles in step (a) for at least one hour by subjecting the particles to a continuously moving stream of inert gas at elevated temperature and at a mass of gas to mass of solids ratio of at least about 0.05 whereby the progress of polymerization of said particles is preferred over the progress of crystallization, and (c) subjecting the particles to a countercurrently moving stream of heated inert gas at a mass of inert gas to mass of solids ratio which is less than the mass ratio maintained in step (b), but the total mass of inert gas to mass of solids ratio for step (a) and step (b) is equal to or greater than 0.6.

2. The process of claim 1 wherein the low molecular weight polyester pre-polymer particles have a volume fraction of crystallinity of at least about 15% and an intrinsic viscosity of at least about 0.20 dl/g.

3. The process of claim 2 wherein contacting the particles with a stream of inert gas at elevated temperature according to step (a) occurs in a fluidized bed, the particles are heated to a temperature in the range of from at least 230° C. up to 240° C. in less than 5 minutes, and the particles reside in the temperature range of 100° C. to 220° C. for less than 5 minutes.

4. The process of claim 2 wherein the temperature of the heated particles introduced into step (b) is raised and maintained at a value in the range of from 235° C. to 240° C.

5. The process of claim 3 wherein the temperature of the heated particles introduced into step (b) is raised and maintained at a value in the range of from 235° C. to 240° C.

6. The process of claim 1 wherein said heat transfer medium is a stream of inert gas at elevated temperature, and the particles are contacted at a mass of gas to mass of solids ratio in the range of from 4:1 to 15:1.

7. The process of claim 4 wherein said heat transfer medium is a stream of inert gas at elevated temperature, and the particles are contacted at a mass of gas to mass of solids ratio in the range of from 4:1 to 15:1.

8. The process of claim 5 wherein said heat transfer medium is a stream of inert gas at elevated temperature, and the particles are contacted at a mass of gas to mass of solids ratio in the range of from 4:1 to 15:1.

* * * * *